United States Patent
Sato

(10) Patent No.: US 10,121,508 B2
(45) Date of Patent: Nov. 6, 2018

(54) MULTITRACK RECORDER

(71) Applicant: TEAC Corporation, Tokyo (JP)

(72) Inventor: Dai Sato, Tokyo (JP)

(73) Assignee: TEAC Corporation, Tokyo (JP)

( * ) Notice: Subject to any disclaimer, the term of this patent is extended or adjusted under 35 U.S.C. 154(b) by 427 days.

(21) Appl. No.: 15/052,720

(22) Filed: Feb. 24, 2016

(65) Prior Publication Data

US 2016/0246563 A1 Aug. 25, 2016

(30) Foreign Application Priority Data

Feb. 25, 2015 (JP) ................................. 2015-035110

(51) Int. Cl.
| | |
|---|---|
| *G06F 3/00* | (2006.01) |
| *G11B 19/02* | (2006.01) |
| *G11B 27/34* | (2006.01) |
| *G11B 27/36* | (2006.01) |
| *G11B 27/32* | (2006.01) |
| *G11B 20/12* | (2006.01) |

(52) U.S. Cl.
CPC ............ *G11B 19/022* (2013.01); *G11B 27/34* (2013.01); *G11B 27/32* (2013.01); *G11B 27/36* (2013.01); *G11B 2020/1238* (2013.01)

(58) Field of Classification Search
None
See application file for complete search history.

(56) References Cited

U.S. PATENT DOCUMENTS

| | | |
|---|---|---|
| 2002/0065570 A1 | 5/2002 | Fujita et al. |
| 2008/0154953 A1 | 6/2008 | Kinouchi et al. |
| 2013/0177160 A1 | 7/2013 | Terai |
| 2014/0056434 A1 | 2/2014 | Terai |

FOREIGN PATENT DOCUMENTS

| | | |
|---|---|---|
| CN | 1341933 A | 3/2002 |
| CN | 1866376 A | 11/2006 |
| JP | 2013-165307 A | 8/2013 |

OTHER PUBLICATIONS

Thomas Haenselmann et al., A zero-vision music recording paradigm for visually impaired people, Jun. 28, 2011, Springer Science & Business Media, Edition or vol. 60, pp. 589-607 (Year: 2011).*
Tim Tully, Vegas Pro: A Good Bet, Sep. 1999, Videography, Edition or vol. 24,9; pp. 46-48 (Year: 1999).*

* cited by examiner

*Primary Examiner* — Tam T Tran
(74) *Attorney, Agent, or Firm* — Seed IP Law Group LLP

(57) ABSTRACT

A multitrack recorder includes a display unit and a control unit. The control unit displays on the display unit a level meter image indicating information on a corresponding track with respect to each of a predetermined number of tracks, and also first number images indicating the respective numbers of some of the tracks so as to be associated with the corresponding respective level meter images irrespective of the states of the some tracks, and, when a focused track is generated among the tracks displayed, temporarily displays a second number image indicating the number of the focused track so as to be associated with the corresponding level meter image. The second number image is displayed in a manner such that at least one of a size, a position, and a color is different from that of the first number image.

3 Claims, 8 Drawing Sheets

MULTITRACK RECORDER

PRIORITY INFORMATION

This application claims priority to Japanese Patent Application No. 2015-035110 filed on Feb. 25, 2015, which is incorporated herein by reference in its entirety.

BACKGROUND

Technical Field

The present invention relates to a multitrack recorder having a plurality of tracks and being capable of recording and reproduction for every track.

Related Art

Conventionally, there has been widely known a multitrack recorder that has a plurality of tracks and is capable of recording and reproduction for every track. Generally, such a multitrack recorder has a display unit, on which the states of the plurality of respective tracks are displayed. For example, JP 2013-165307 A discloses a multitrack recorder that displays on a display unit the number of aligned bar graphs (a level meter), each indicating the level of a sound signal of a corresponding track, the number corresponding to the number of tracks. In Patent Document 1, as a corresponding track number is additionally shown on the lower side of each level meter, it can be readily understood that each level meter indicates a sound signal of the corresponding track.

Recently, there has been a desire to increase the number of tracks mounted in a single multitrack recorder. When the number of tracks is increased, naturally, the number of level meters displayed increases. However, in order to display an increased number of level meters as a result of an increase of the number of tracks without changing the display format of the level meters, it is necessary to enlarge the size of the display unit. This, however, may result in enlargement in the size of the entire multitrack recorder.

In order to address the above, it is considered that the display size (width) of the level meter is made smaller when the number of tracks is increased to display a larger number of level meters while preventing increase of the size of the display screen. However, although the width of the level meter can be reduced with relative ease, visibility will be deteriorated when the track number that is displayed so as to be associated with each level meter is shown smaller in size. This resultantly deteriorates operability of the multitrack recorder. Meanwhile, when the display size of the track number remains unchanged, display ranges of adjacent track numbers may partially overlap each other. This also deteriorates visibility and operability. This problem can arise when displaying not only the level meter but also a list of setting conditions of all tracks.

In view of the above, the present invention aims to provide a multitrack recorder capable of displaying a list of information items concerning a larger number of tracks without deteriorating visibility and operability.

SUMMARY

A multitrack recorder according to the present invention having a plurality of tracks and capable of recording and reproduction for every track comprises a display unit; and a control unit for displaying information on each of the plurality of tracks on the display unit, wherein the control unit displays on the display unit a track information image indicating information on a corresponding track with respect to each of a predetermined number of tracks, and displays first number images indicating respective numbers of some of the tracks displayed so as to be associated with the respective track information images corresponding to the some tracks irrespective of states of the some tracks, and further temporarily displays, when a focused track is generated among the tracks displayed, a second number image indicating a number of the focused track so as to be associated with a track information image corresponding to the focused track, and the second number image is displayed in a manner such that at least one of a size, a position, and a color is different from that of the first number image.

According to a preferable aspect, the plurality of tracks may be grouped into blocks for every predetermined number of items, and only the number of a representative track among the tracks included in each block may be displayed for every block as the first number image.

According to another preferable aspect, the track information image may include a level meter image indicating a signal level of a corresponding track, and the focused track may be a track with a signal level in excess of a predetermined threshold. According to yet another preferable aspect, the focused track may be a track selected by a user.

According to the present invention, images indicating the numbers of some tracks are displayed irrespective of the states of the tracks and, when a focused track is generated, an image indicating the number of the focused track is displayed as well. Therefore, it is possible to promptly and reliably recognize a necessary track number. Further, as all track numbers are not displayed, it is possible to display information on a larger number of tracks as a list. That is, according to the present invention, it is possible to display information on a larger number of tracks as a list without deteriorating visibility and operability.

BRIEF DESCRIPTION OF THE DRAWINGS

A preferred embodiment of the present invention will be described in detail by reference to the following drawings, wherein.

DETAILED DESCRIPTION OF THE INVENTION

Figure 1:
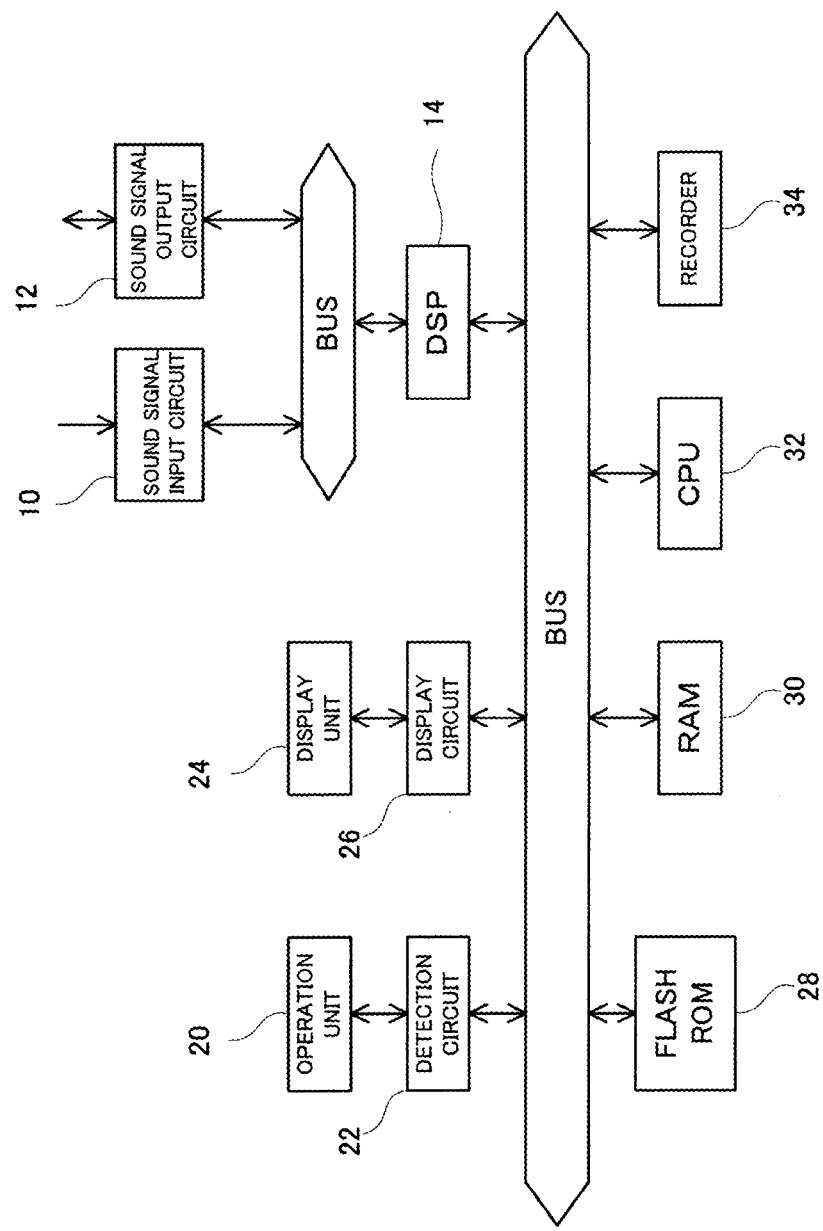
FIG. 1 is a block diagram showing a structure of a multitrack recorder according to an embodiment of the present invention.
Figure 2:
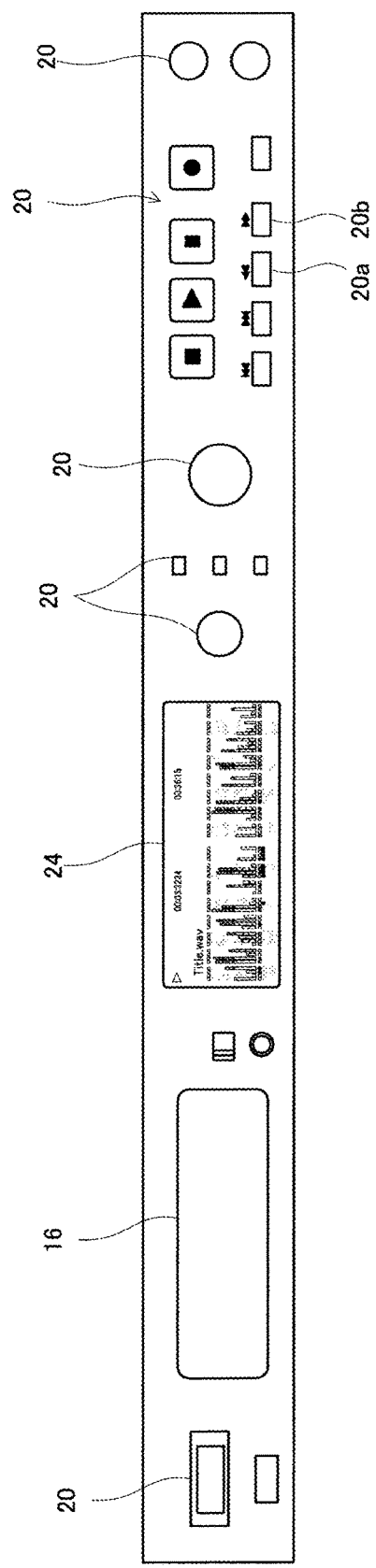
FIG. 2 is a schematic front view of a multitrack recorder.

In the following, an embodiment of the present invention will be described referring to the drawings. FIG. 1 is a block diagram showing a structure of a multitrack recorder according to an embodiment of the present invention. FIG. 2 is a schematic front view of a multitrack recorder.

The multitrack recorder has sixty-four tracks, and can individually record a sound signal in each track and reproduce a sound signal recorded in each track. A sound signal input circuit 10 has a plurality of input ports, and inputs sound signals from a plurality of sound sources (source). The sound signal inputted from the sound signal input circuit 10 is supplied via a bus to a DSP (digital signal processor) 14.

Under control by a CPU 32, the DSP 14 applies various digital processing, for example, effect processing, equalizing processing, mixing processing, or the like, to a sound signal from the plurality of sources, supplied from the sound signal input circuit 10, and records in a recorder 34 via a bus. The recorder 34 selectively records (recording) the input signal subjected to the processing in the sixty-four tracks. Note that the sixty-four tracks may all be monaural tracks, or some or all of the sixty-four tracks may be paired to make stereo tracks. One or more mix tracks may be allocated so that stereo, monaural, and mix can be desirably switched. In this embodiment, an SSD (solid state drive) is used as a recording medium of the recorder 34. Amounting slot 16 for mounting the SSD is formed on the front surface of the device. However, an optical disk, such as a CD-R/RW or a DVD-R/RW, a hard disk, a flash memory medium, or the like, may be used as a recording medium.

In response to a user operation, an operation unit 20 generates an electric signal in accordance with the operation. The operation unit 20 includes a variety of key switches and selection buttons, a menu button, a enter button, or the like. A user can record a sound signal from a plurality of sources in a plurality of tracks, or reproduce a signal recorded in each track by operating the operation unit 20. The state of operation of the operation unit 20 is detected by a detection circuit 22. The detection circuit 22 supplies an operation state detection signal from the operation unit 20 to the CPU 32 via the bus.

The CPU 32 executes overall control with respect to the multitrack recorder. That is, according to a program recorded in a flash ROM 28, the CPU 32 executes various processing, using a RAM 30 as a working memory. Further, the CPU 32 supplies various information items to a display circuit 26. The display circuit 26 displays various information items on a display unit 24. The CPU 32 instructs the display circuit 26 to display the level of a sound signal of each track as a level meter image 40 in the form of a bar graph. The display circuit 26 displays the level meter image 40 on the display unit 24, based on the information from the CPU 32. In order to facilitate identification of the level meter image 40 displayed on the display unit 24, the CPU 32 instructs the display circuit 26 to display a first number image 46 indicating a track number and tile images 42, 44 each indicating the state of setting or the like of each track. Further, the CPU 32 reads a sound signal recorded in the recorder 34 to supply to the DSP 14 in response to an operation state detection signal from the detection circuit 22. The DSP 14 outputs the sound signal to the outside via a bus and a sound signal output circuit 12. The sound signal output circuit 12 includes various output ports, such as an analog output port, a digital output port, and the like.

As shown in FIG. 2, the respective operation units 20, the SSD slot 16, and the display unit 24 are formed on the front surface of the multitrack recorder. The operation units 20 include a selection switch or a jog dial for allocating a sound signal of an input channel to any of the tracks 1 to 64, an operation switch for instructing recording, reproduction, stop, fast-forwarding, or rewinding of a sound signal recorded in the recorder 34, or the like.

The SSD slot 16 is formed near the left end of the front surface of the multitrack recorder. Next to the SSD slot 16; that is, at the substantial center of the front surface of the multitrack recorder, the display unit 24 is provided. The display unit 24 is made from a liquid crystal display, an organic EL display, or the like. On a basic home screen image among the various screen images displayed on the display unit 24, the levels of the sound signals corresponding to the sixty-four respective tracks are displayed as a list. Note here that, as shown in FIG. 2 and as described above, in this embodiment, the SDD slot 16 is formed on the front surface where the display unit 24 is provided. As the SSD is a large-scaled recording medium having a relatively large capacity, when the mounting slot 16 for mounting the SSD is formed on the front surface where the display unit 24 is mounted, the size of the display unit 24 is significantly restricted. Further, when information on the sixty-four tracks is displayed as a list on the display unit 24 subjected to size restriction, visibility may likely be deteriorated. In order to address the above, information on the respective tracks is displayed in a special manner in this embodiment so that information of the sixty-four respective tracks can be promptly identified. This will be described referring to FIGS. 3 to 5.

Figure 3:
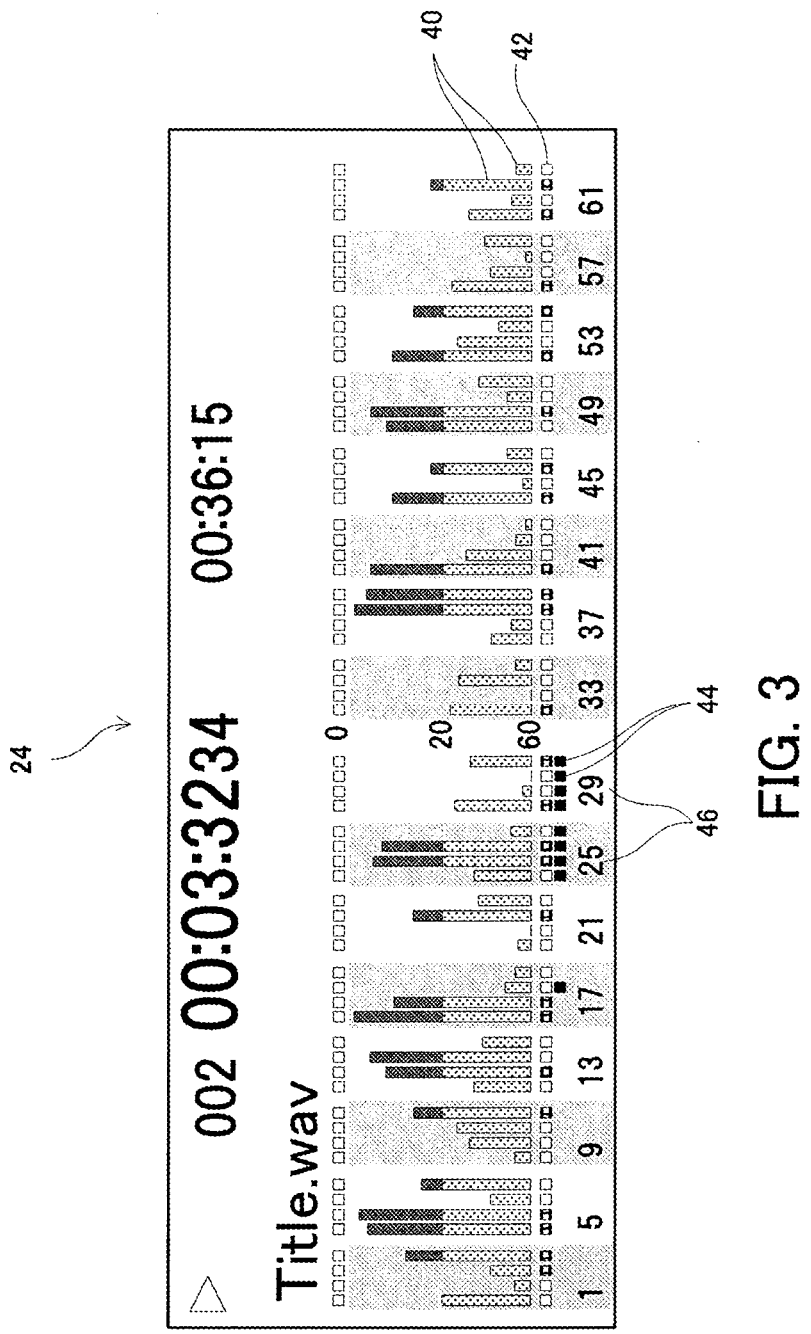
FIG. 3 shows a home screen.

FIG. 3 shows a home screen image displayed on the display unit 24. In the upper part of the home screen, various time information items (an elapsed period of time and a remaining period of time) and the title of a piece of music are displayed, and the level meter images 40 for the sixty-four tracks are displayed aligned on the lower side of the time information. Each level meter image 40 is a bar graph indicating the level of a sound signal of a corresponding track. The length of the level meter image 40 varies with the level of the sound signal of each track. The color of the level meter image 40 is changed at the middle position (−20 dB) thereof. For example, the part of the level meter image 40 between −60 dB and −20 dB is displayed in light blue (shown in light gray in the diagram), and the part between −20 dB and −0 dB is displayed in dark blue (shown in dark gray in the diagram). With the color of the level meter image 40 changed as described above, it is possible to know at a glance whether or not a sound signal of a corresponding track exceeds −20 dB.

On the lower side of each level meter image 40, a recording tile image 42 is displayed. The recording tile image 42 is a square image indicating a record setting state of a corresponding track. That is, in this multitrack recorder, it is possible to set "record/not record" with respect to each of the sixty-four tracks. The recording tile image 42 changes its color depending on the record setting state of the corresponding track. For example, the recording tile image 42 is displayed in red (shown in grid hatching in the diagram) when "record" is set for the corresponding track, and in gray (shown in white in the diagram) when "not record" is set.

Further, on the lower side of the recording tile image 42, a monitoring tile image 44 is displayed. Similar to the recording tile image 42, the monitoring tile image 44 is a square image indicating a setting of the corresponding track as to whether or not it is necessary to monitor an input sound. That is, in this multitrack recorder, it is possible to set "monitor/not monitor an input sound" with respect to each of the sixty-four tracks. The monitoring tile image 44 is switched between being displayed and being not displayed, depending on the monitoring setting state of the corresponding track. Note that it is desirable that the monitoring tile image 44 is displayed in a color different from that of the recording tile image 42. For example, the monitoring tile image 44 is displayed in blue (shown in black in the diagram) when "monitor" is set for the corresponding track, and is not displayed when "not monitor" is set.

These level meter image 40, recording tile image 42, and monitoring tile image 44 constitute a track information image indicating information on the corresponding track. In this embodiment, the level meter image 40, the recording tile image 42, and the monitoring tile image 44 are vertically aligned to constitute a single track information image, and the track information images for the sixty-four tracks are horizontally aligned. With the above, the states of all of the sixty-four tracks are displayed as a list. However, with only simple alignment of the level meter images 40, it is still difficult to recognize which track is indicated by each level meter image 40. This problem can be solved by displaying a track number so as to be associated with each track information image (the level meter image 40 or the like). However, in the case where the display unit 24 is a small device in the size, as in this embodiment, displaying the numbers of all tracks results in excessively small display of the track numbers or the display ranges overlapping to each other between adjacent track numbers. This makes it difficult to read the displayed letter. In order to address this problem, in this embodiment the sixty-four tracks are grouped into blocks for every four tracks, and only the number of a representative track of the tracks included in each block is displayed on the display unit 24. Further, when a focused track is generated among the sixty-four tracks, the track number of the focused track is temporarily displayed.

That is, in this embodiment, in order to facilitate identification of the track information images of the sixty-four tracks, respective intervals between positions of the track information display images and the background of the track information display image are made different to thereby clarify the boundary of the blocks. In the example shown, the interval W1 between the positions of the track information images belonging to different blocks is larger than the interval W2 between the positions of those belonging to the same block. Further, the background color of the display unit is alternately switched for every block.

Further, in this embodiment, the first number image 46 indicating the number of the representative track of the four tracks belonging to a single block is displayed on the lower side of the track information image of the corresponding track. In this embodiment, the head track of the four tracks belonging to one block is made a representative track. As a result, as shown in FIG. 3, only the $1^{st}$, $5^{th}$, $9^{th}$, to $61^{st}$ track numbers are displayed on the lower side of the track information images. When the track numbers are thinned out to be displayed, as described above, preferable visibility can be obtained while avoiding overlapping of the display ranges of the track numbers, even though the image size of the track number is not made excessively small.

Note here that the track number of each of the tracks with the track number thereof not displayed among the four tracks constituting a single block can be known by adding the order of the track with the track number thereof not displayed within the block to the representative track number. For example, in FIG. 4, the track number of the track information image A is known as 28 as a result of addition of the representative track number; namely, "25," of the block to which the track information image A belongs and the order of the track information image A within the block; namely, "3." It is said that generally a man can recognize three to four numbers at a glance. Therefore, when the number of at least the head track of the four tracks is displayed, the other track numbers can be recognized with relative ease.

Note that although four tracks constitute one block in this embodiment, a larger or smaller number of tracks may constitute one block, so long as that number allows ready recognition of the number of each track. Further, although the head track in each block is made a representative track in this embodiment, another track, for example, the middle track or the end track, may be made a representative track. For example, five tracks may constitute one block, the middle track (the track with the inter-block order is $3^{rd}$) may be made a representative track, and the track number of the middle track may be displayed. This structure as well can achieve relatively ready recognition of the numbers of all tracks.

Figure 5:
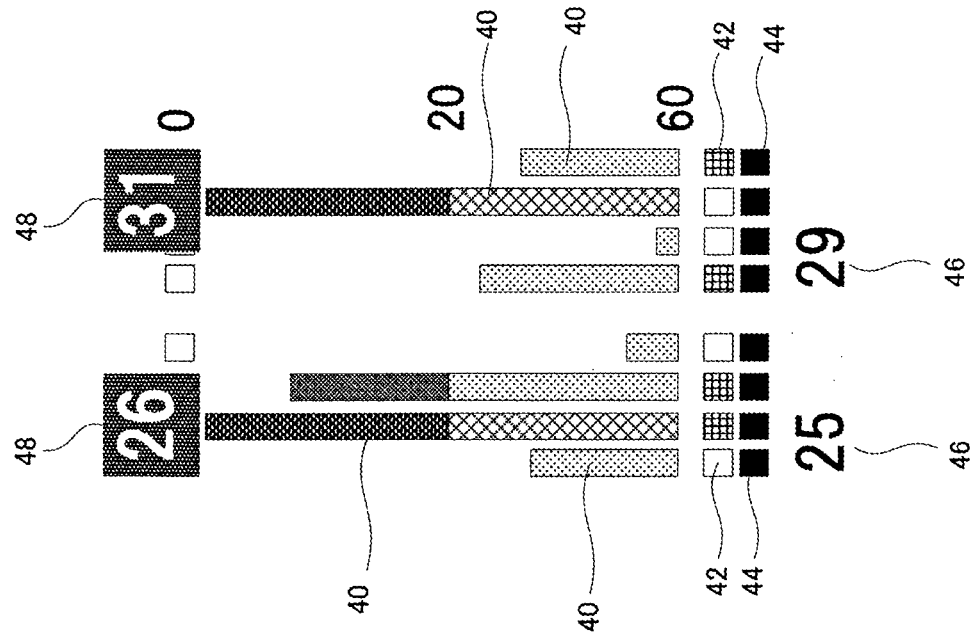
FIG. 5 shows enlarged a part of a home screen.
Figure 4:
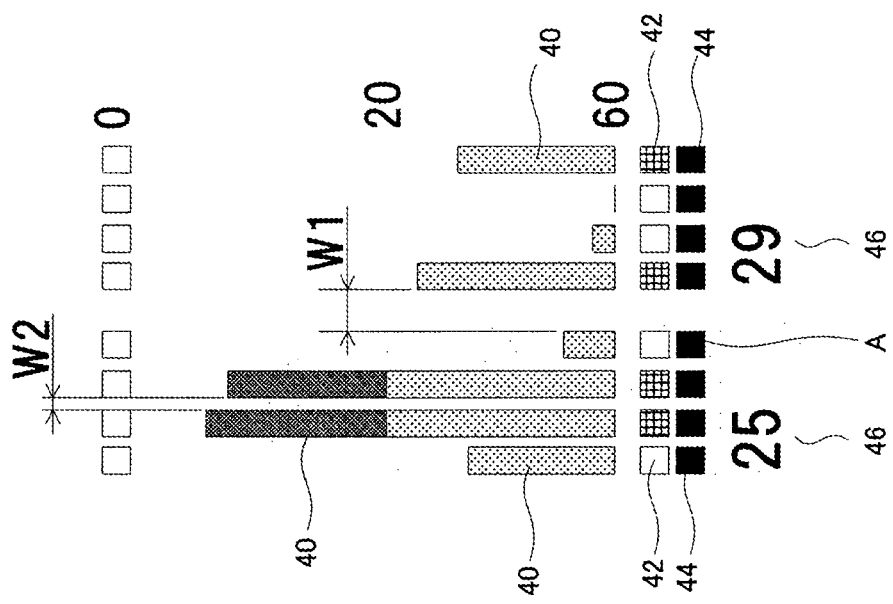
FIG. 4 shows enlarged a part of a home screen.

Note here that there may be a case in which it is desired to promptly recognize a specific track when, for example, sound signal processing or the like is executed in the multitrack recorder. For example, when the level of a sound signal of a specific track exceeds the upper limit value (when the level overloads), the sound signal is clipped at the upper limit value. In such a case, it is desirable that the number of the track clipped can be promptly specified. In view of the above, in this embodiment, at the time of overload, the color of the level meter image 40 of the corresponding track is changed, and a second number image 48 indicating the number of the corresponding track is displayed. FIG. 5 shows a display that is made when the sound signals of the $26^{th}$ and $31^{st}$ tracks are overloaded. As shown in FIG. 4, when the sound signals of the $26^{th}$ and $31^{st}$ tracks are overloaded, the level meter images 40 of the corresponding tracks are displayed in a color different from a regular color. For example, when the regular level meter image 40 is displayed in light blue (−60 dB–−20 dB) and dark blue (−20 dB-0 dB), the level meter image 40 of a track overloaded is displayed in light red (−60 dB–−20 dB) (shown in large grid hatching in the diagram) and in dark red (−20 dB-0 dB) (shown in small grid hatching in the diagram). With the above, presence or absence of a track overloaded can be readily recognized.

On the upper side of track information image of a track overloaded, the second number image 48 indicating the number of the track is displayed. The second number image 48 is an image different in the position, color, and size from the first number image 46. In this embodiment, the second number image 48 is displayed in red, similar to the level meter image 40, on the opposite side (on the upper side) of the first number image 46 with the track information image in-between. Further, the second number image 48 is slightly larger than the first number image 46. The second number image 48 is temporarily displayed only while overloaded is occurring; that is, only when a focused track is generated. When overload is resolved, the second number image 48 is no longer displayed. As described above, when the focused track is generated, the second number image 48 indicating the number of the focused track is displayed, so that a user can promptly and reliably recognize the number of the focused track.

As is obvious from the above description, as in this embodiment the track numbers are thinned out to be displayed, it is possible to prevent overlapping of the display areas of the track numbers and thus to improve visibility and operability even though the display unit 24 is small. Further, as the second number image 48 indicating the number of a focused track is temporarily displayed when the focused track is generated, it is possible to promptly and reliably recognize the number of the focused track. This can improve visibility and operability.

Figure 6:
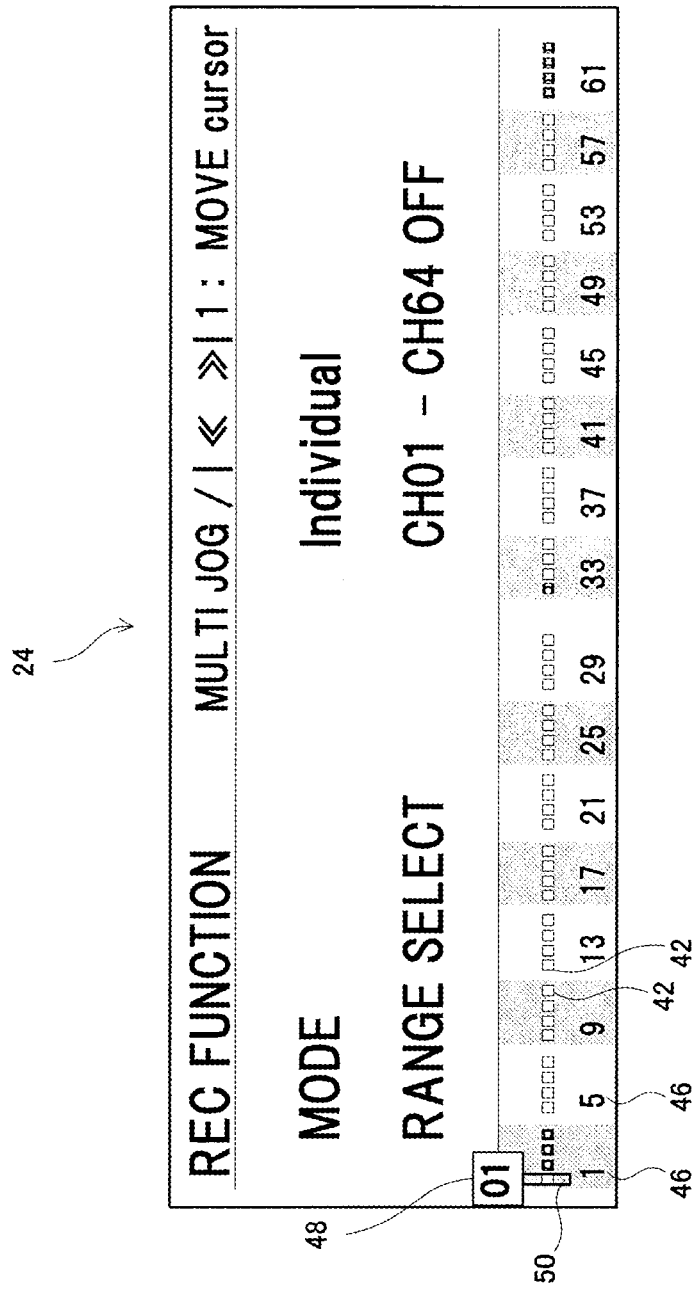
FIG. 6 shows a record setting screen.

In the following, a record setting screen will be described by reference to FIGS. 6 and 7. FIG. 6 shows a record setting screen, and FIG. 7 shows enlarged a part of the record setting screen. As described above, in this embodiment it is possible to set "record/not record" with respect to each of the sixty-four tracks. In making this record setting, the operation switch or the like is operated to display the record setting screen shown in FIG. 6. On the recording setting screen, the recording tile images 42 for the sixty-four tracks are displayed horizontally aligned, and constitute the track information image. The recording tile images 42 (the track information image) are grouped into blocks for every four and displayed, similar to the level meter image 40 or the like on the home screen. Further, the first number image 46 indicating the number of the head track (the representative track) of each block is displayed on the lower side of the recording tile image 42. Each recording tile image 42 is displayed in red when "record" is set for the corresponding track, and in gray when "not record" is set.

On the record setting screen, a cursor 50 for selecting a setting target track is also displayed. The cursor 50 has a substantially rectangular shape that surrounds the recording tile image 42 and moves between tracks in response to an operation of a fast forward switch 20a and a rewinding switch 20b. In this embodiment, a track selected by the cursor 50; that is, a setting target track, is made a focused track. Then, the second number image 48 indicating the number of the focused track is displayed on the upper side of the recording tile image 42. When the setting target track is changed as the cursor 50 moves, the track number displayed as the second number image 48 is also changed.

Figure 7A:
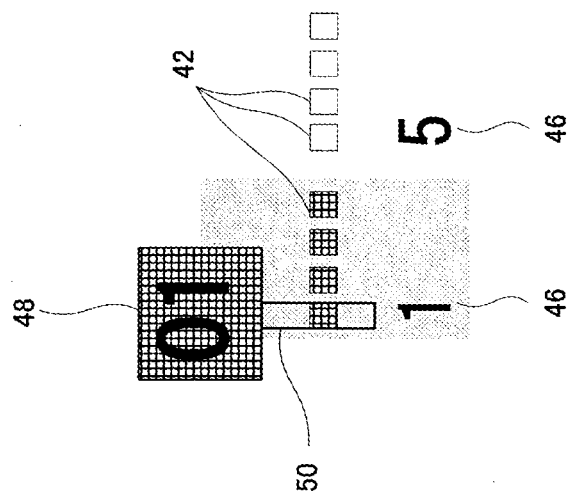
FIG. 7A shows enlarged a part of a record setting screen.
Figure 7B:
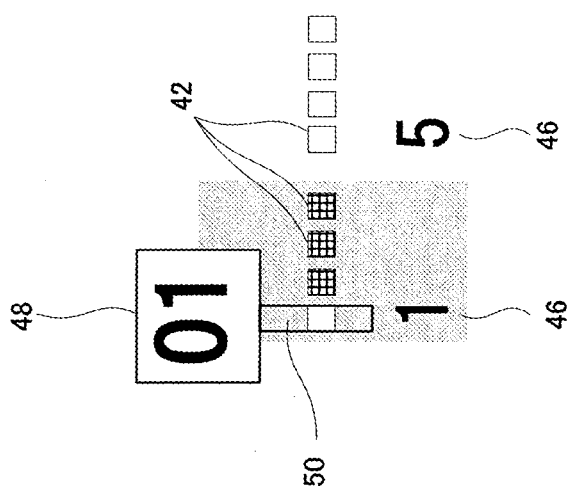
FIG. 7B shows enlarged a part of a record setting screen.

It is desirable that the second number image 48 is displayed in the same color as that of the recording tile image 42 of the focused track. For example, as shown in FIG. 7A, when the first track with the setting "not record" is selected, the second number image 48 is displayed in gray, similar to the recording tile image 42. When a user thereafter operates the operation switch to change the setting of the first track to "record," the recording tile image 42 is changed to be displayed in red, as shown in FIG. 7B. It is desirable that the second number image 48 is also changed to be displayed in red, following this change. As described above, when only the numbers of some tracks are displayed as the first number images 46 and the number of the focused track is displayed as the second number image 48 in a manner different from that of the first number images 46 also on the record setting screen for each track, it is possible to more promptly and reliably recognize the number of each track, and to improve operability.

Figure 8:
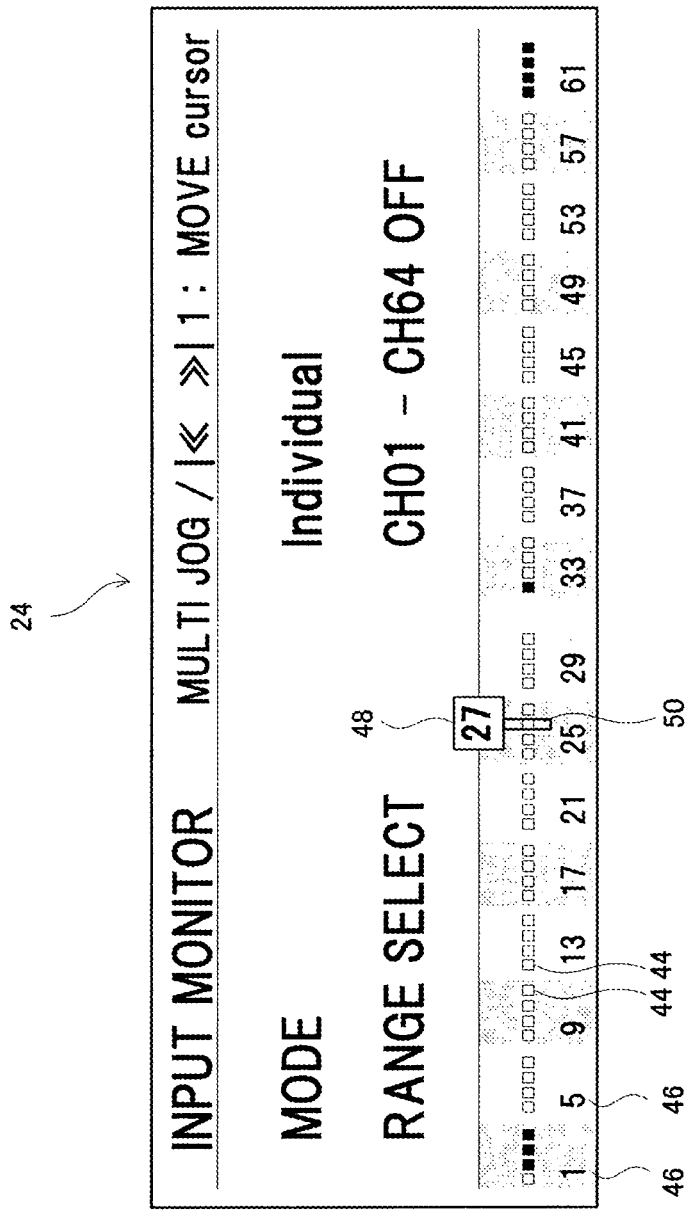
FIG. 8 shows an input sound monitoring setting screen.
Figure 9A:
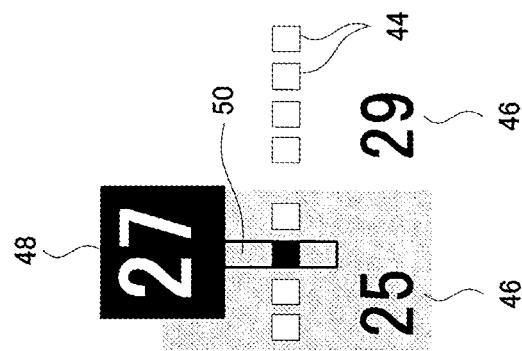
FIG. 9A shows enlarged a part of an input sound monitoring setting screen.
Figure 9B:
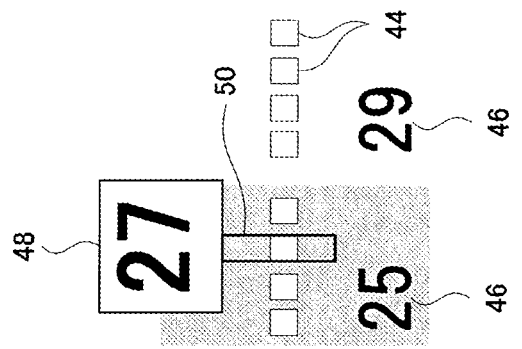
FIG. 9B shows enlarged a part of an input sound monitoring setting screen.

FIGS. 8 and 9 show an input sound monitoring setting screen. Similar to the record setting screen, it is desirable that the numbers of only some of the tracks are displayed as the first number images 46 and the number of the focused track is displayed as the second number image 48 in a manner different from that of the first number image 46 on the input sound monitoring setting screen as well. In this case as well, it is desirable that the color of the second number image 48 is the same as that of the monitoring tile image 44 (blue for "monitor" and gray for "not monitor").

Note that desirable modifications can be made to the above-described structure other than the structure in which the first number images 46 indicating the numbers of some tracks are displayed so as to be associated with the respective corresponding track information images irrespective of the states of the tracks and the second image indicating the number of a focused track is temporarily displayed when the focused track is generated. For example, although in this embodiment the number of tracks displayed as a list is sixty-four, this number maybe desirably changed. For example, two kinds of display formats may be prepared so as to be switchable, and information on the first to thirty-second tracks maybe displayed as a list when the first display format is selected, and information on the thirty-third to sixty-fourth tracks may be displayed as a list when the second display format is selected. Further, the color and the display format of each image and layout may be desirably changed depending on the capability of the multitrack recorder and the size or the like of the display unit 24.

What is claimed is:

1. A multitrack recorder having a plurality of tracks and capable of recording and reproduction for every track, comprising:
   a display unit; and
   a control unit for displaying information on each of the plurality of tracks on the display unit,
   wherein:
      the control unit displays on the display unit a track information image indicating information on a corresponding track with respect to each of a predetermined number of tracks, and displays first number images indicating respective numbers of some of the tracks displayed so as to be associated with the respective track information images corresponding to the some tracks irrespective of states of the some tracks, and further temporarily displays, when a focused track is generated among the tracks displayed, a second number image indicating a number of the focused track so as to be associated with a track information image corresponding to the focused track,
      the second number image is displayed in a manner such that at least one of a size, a position, and a color is different from that of the first number image,
      the plurality of tracks are grouped into blocks for every predetermined number of items, and
      only a number of a representative track among tracks included in each block is displayed for every block as the first number images.

2. The multitrack recorder according to claim 1, wherein the track information image includes a level meter image indicating a signal level of a corresponding track, and the focused track is a track with a signal level in excess of a predetermined threshold.

3. The multitrack recorder according to claim 1, wherein the focused track is a track selected by a user.

* * * * *